United States Patent [19]
Roth

[11] Patent Number: 5,701,058
[45] Date of Patent: Dec. 23, 1997

[54] METHOD OF SEMIAUTOMATIC AMBIENT LIGHT SENSOR CALIBRATION IN AN AUTOMATIC CONTROL SYSTEM

[75] Inventor: Roger R. Roth, Minnetonka, Minn.

[73] Assignee: Honeywell Inc., Minneapolis, Minn.

[21] Appl. No.: 582,861

[22] Filed: Jan. 4, 1996

[51] Int. Cl.$^6$ .................................................... H05B 37/02
[52] U.S. Cl. .......................... 315/158; 315/307; 315/149; 364/157; 364/165; 250/214 D
[58] Field of Search .................................. 315/158, 307, 315/156, 308, 149; 364/149, 150, 157, 165, 400, 148; 362/802; 250/214 AL, 214 D

[56] References Cited

U.S. PATENT DOCUMENTS

| | | | |
|---|---|---|---|
| 3,735,141 | 5/1973 | Beling | 250/214 R |
| 3,962,600 | 6/1976 | Pittman | 315/158 |
| 4,158,492 | 6/1979 | Kitaura et al. | 354/24 |
| 4,234,820 | 11/1980 | Widmayer | 315/152 |
| 4,236,101 | 11/1980 | Luchaco | 315/158 |
| 4,281,365 | 7/1981 | Elving et al. | 362/20 |
| 4,500,814 | 2/1985 | Blake | 315/323 |
| 4,523,128 | 6/1985 | Stamm et al. | 315/291 |
| 4,538,218 | 8/1985 | Watson | 362/802 |
| 4,587,459 | 5/1986 | Blake | 315/158 |
| 4,612,479 | 9/1986 | Zansky | 315/194 |
| 4,631,675 | 12/1986 | Jacobsen et al. | 364/400 |
| 4,701,669 | 10/1987 | Head et al. | 315/155 |
| 4,904,906 | 2/1990 | Atherton et al. | 315/291 |
| 4,988,921 | 1/1991 | Ratner et al. | 315/159 |
| 5,115,967 | 5/1992 | Wedekind | 236/46 R |
| 5,251,392 | 10/1993 | McManigal | 362/276 X |
| 5,406,173 | 4/1995 | Mix et al. | 315/156 |
| 5,459,376 | 10/1995 | Buij et al. | 315/297 |

FOREIGN PATENT DOCUMENTS

| | | |
|---|---|---|
| 0652690 | 5/1995 | European Pat. Off. |
| 0659035 | 6/1995 | European Pat. Off. |

OTHER PUBLICATIONS

F.Rubinstein,M.Siminovitch,R. Verderber, "Fifty Percent Energy Savings with Automatic Lighting Controls", IEEE Transactions on Industry Applications 29 (1993) Jul./Aug., No. 4, New York, US.

"Electronic Ballast Ambient Light Sensor", Honeywell Article, Form No. 63–2255, 1990.

Authors: Francis Rubinstein and Rudy Verderber, Lawrence Berkeley Laboratory, "Automatic Lighting Controls Demonstration", Mar. 1990, prepared for Pacific Gas and Electric Company.

Authors: F.Rubinstein, G. Ward,R. Verderber, Lawrence Berkeley Laboratory "Improving the Performance of Photo–Electrically Controlled Lighting Systems", Feb. 16, 1988.

Prepared by Subcommittee on Practical Guide to Photmetry. "IES Practical Guide to Photometry", LM–36 Oct. 1971 Journal of the Illuminating Engineering Society.

Frank Rubinstein, "Photoelectric Control of Equi–illumination Lighting Systems", Energy and Buildings, 6 (1984) 141–150.

F.Rubinstein, G.Larson,R. Verderber, "The Effect of Control Algorithm and Photosensor Response on the Performance of Daylight–Following Lighting Systems" (date unknown).

F.Rubinstein,G. Ward "The Control of Daylight–Linked Lighting Systems", Jun. 1984, Article presented at IEEE Industry Applications Society Annual Meeting, Sep. 30–Oct. 4, 1984, Chicago Illinois.

(List continued on next page.)

*Primary Examiner*—Robert Pascal
*Assistant Examiner*—Arnold Kinkead
*Attorney, Agent, or Firm*—Ian D. MacKinnon

[57] ABSTRACT

A method of calibrating a dimmable lighting system having an electric lighting fixture and light sensor in an electronic controller. The method comprises a system which makes eight measurements while controlling illumination levels from both indoor and outdoor lighting. The method calculates a set point and a gain which are utilized to maintain a constant lighting level at a lighting point of interest.

9 Claims, 4 Drawing Sheets

OTHER PUBLICATIONS

Kurt S. Stöltun, "Office Lighting and Lighting Principles, a study done for Honeywell", Aug. 31, 1992.

C. Benton, M. Fountain, S. Selkowitz (Lawrence Berkeley Labs) & J. Jewell, "Control System Performance in a Modern Daylighte Office Building", (date unknown).

S. Selkowitz, J. Tom (Lawrence Berkeley Labs for California Institute for Energy Effiency), "Envelope/Lighting Technology to Reduce Electric Demand", Dec. 15, 1989.

HPM Industries Pty Ltd, "Filament Driver Cat FD238 for Two Wire dimming of Fluorescent Lights" (date unknown).

METHOD OF SEMIAUTOMATIC AMBIENT LIGHT SENSOR CALIBRATION IN AN AUTOMATIC CONTROL SYSTEM

FIELD OF THE INVENTION

The present invention relates to dimmable lighting systems. More particularly it relates to an improved method of calibrating ambient light levels in lighting systems operated by automatic control systems.

BACKGROUND OF THE INVENTION

With the increased attention on energy-conservation in building design, architects and building owners and operators are utilizing automatically dimming lighting systems to decrease electrical consumption and costs. However, because indoor levels of natural light can vary substantially, based both on predictable variables such as time of day and on unpredictable variables such as weather conditions and shade positions, no predetermined, open-loop dimming schedule can guarantee adequate and even lighting at a given work plane at all times. In an attempt to solve this problem, various parties have developed dimming systems incorporating feedback control of the artificial light output.

Such systems for controlling the amount of illumination emitted by a light source are typically referred to as dimming control arrangements. Such a system, designed for use with fluorescent lighting, is disclosed in U.S. Pat. No. 4,904,906 assigned to the assignee of the present invention and is hereby incorporated by reference. These systems utilize an ambient light sensor, or photocell, to monitor the ambient light level in a space. The sensor converts the light it receives into an electrical signal. This signal is supplied to an electronic control circuit which adjusts the level or quality of the power supplied to the light source according to a predetermined algorithm. This algorithm can be either proportional, integral, or differential.

Lighting control system in a typical room have a lighting point of interest, typically a work plane and its surroundings, located within an illuminated space, typically a room or other enclosed space within a building. Artificial light Ee from an electric light fixture and natural light Eo, entering through a window from outside the room illuminate the point of interest. Some of the light on the illuminated point of interest and surroundings is reflected into the ambient light sensor as reflected light Es. The light sensor, also referred to as a photocell, is typically mounted in the ceiling above the lighting point of interest, though it may also be mounted anywhere within the illuminated space. The sensor converts the reflected light it receives Es into an electrical signal whose voltage, typically zero to ten volts, is proportional to the light it receives. The sensor voltage is supplied to an electronics control circuit which calculates the amount of electrical light that is needed within the illuminated space. The control circuit may be located anywhere, but is typically installed in the sensor, in the light fixture, or in a separate box. The algorithm employed by the control circuit may be either a proportional, integral, and/or differential control system. Lighting control systems typically utilize a proportional control system.

The parameters of the control algorithm are typically adjustable after installation so that a technician can calibrate the light level at the point of interest to any desired level. Although many systems have only a setpoint adjustment for the lighting level, ideally both gain and setpoint are adjustable by the technician. Other systems have only one setpoint adjustment, but allow gain adjustment between multiple fixed gains using an automatic switch. The Honeywell EL7365 ambient light sensor is an example of such a system.

The prior art requires a labor-intensive, trial-and-error calibration process. The technician manually places a light meter at the point of interest. The technician then adjusts the lighting parameters, by rotating a potentiometer which changes the resistance in an analog circuit, until the light at the point of interest reaches the desired level. The technician conducts this first reading when there is no outside light Eo at the point of interest, either at night or with the window shades fully closed. Later, with natural sunlight entering the room through the outside window, the parameters are again adjusted until the light at the point of interest reaches the desired level.

Several factors can complicate this process. First, readjustment is often required so that light at the point of interest remains steady with or without natural daylight Eo. This problem is further complicated because the angle of the daylight entering the room changes with the time of day, since most windows are not equipped with light diffusers. Second, since the adjustment is completely manual, the technician will need to make several time-consuming adjustments to 'zero-in' on the desired light settings. Third, if the adjustments are made at the light fixture or the light sensor, the technician must climb a ladder to make a trial adjustment, then climb back down the ladder to avoid blocking the light, and then read the light meter for each adjustment.

SUMMARY OF THE INVENTION

It is provided by the present invention, therefore, a method for semi-automatically calibrating an automatic lighting control system which overcomes many of the drawbacks associated with prior art systems. This method utilizes a light meter and a programmer communicating with the lighting control system. The programmer senses the lighting level at the point of interest via the light meter and interactively adjusts the lighting level through the lighting control system, which controls the power controller for the lighting lamps, usually a dimmable ballast. By reading the ambient light levels with the outdoor lighting at both minimum and maximum levels and with the electric lighting at both minimum and maximum levels, the programmer calculates the electronic gain and setpoint required to provide adequate light to the point of interest at any outdoor light level. The programmer then disconnects from the lighting control system and reads the light level at the point of interest at both minimum and maximum outdoor light levels. If these readings do not agree with predicted light levels calculated by the programmer, the programmer makes suggestions to the technician for further adjustments.

Thus it is appreciated that the above described problems are eliminated in a manner as described hereinafter and that further advantages and details of the invention can be had from the following descriptions and claims taken together with the accompanying drawing.

DETAILED DESCRIPTION

The subject invention and the environment in which it is to be used will initially be described in detail. Following that description, the method of use as well as the mathematical representations will be presented.

Figure 1:
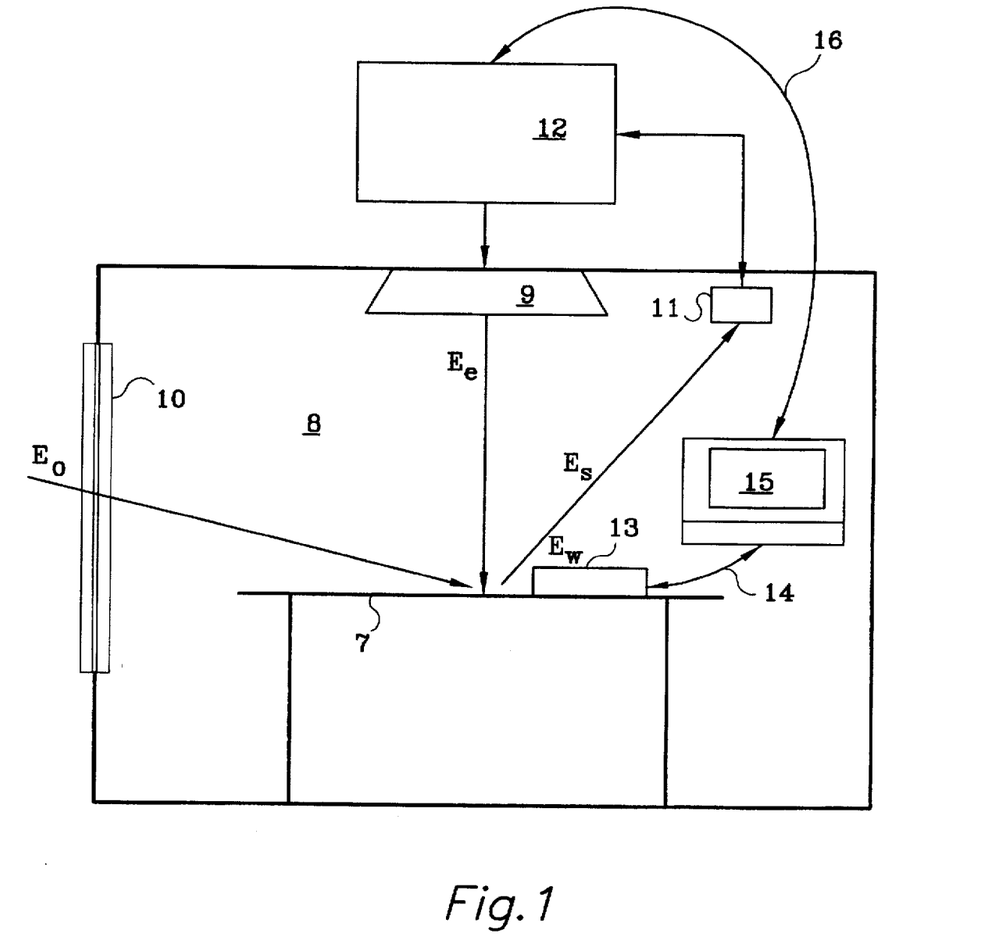
FIG. 1 is a diagram illustrating the present invention.

Referring to FIG. 1, a lighting point of interest 7, is located within an illuminated space 8, typically a room or other enclosed space within a building. Artificial light Ee from an electric light fixture 9 and natural light Eo, entering through a window 10 from outside the room illuminate the point of interest 7. Some of the light on the illuminated point of interest 7 and its surroundings is reflected into the ambient light sensor 11 as reflected light Es. Light sensor 11, also referred to as a photocell, is typically mounted in the ceiling above the lighting point of interest 7, though it may also be mounted anywhere within the illuminated space 8. Light sensor 11 converts the reflected light Es it receives into an electrical signal whose voltage, typically zero to ten volts, is proportional to the level of the reflected light Es it senses. The voltage of light sensor is supplied to dimming electronics 12, which calculate the amount of electrical light Ee that is needed within illuminated space 8. Dimming electronics 12 may be located anywhere, but are typically installed in the light sensor 11, in or near the light fixture 9, or in a separate box.

The system may be calibrated with the aid of a light meter 13 which can be placed at the illuminated point of interest 7 and measure the illumination level there. This light meter 13 can be connected to a programmer 15, which in the preferred embodiment is a laptop personal computer but could be any of a number of microprocessor-based devices, whether dedicated or general purpose. This connection may be accomplished by means of an electrically conductive wire 14, radio-frequency, infra-red, or any of a number of well known communications mediums. The programmer is in turn connected to the dimming electronics 12, again either by means of an electrically conductive wire 16, radio-frequency, infra-red, or any of a number of well known communications mediums.

The light meter 13 measures the lighting level Ew at the illuminated point of interest 7, and reports the instantaneous lighting level Ew to the programmer. Through a series of measurements initiated by a technician at a programmer's keyboard or keypad or similar data entry device, the programmer 15 calculates the gain and setpoint needed to maintain a constant light level Ew at the illuminated point of interest for variable outside light levels Eo. The programmer 15 then transmits the gain and setpoint to the electronics 12. The electronics 12 then applies these parameters, e.g. gain and setpoint, to the control algorithm.

Figure 2:
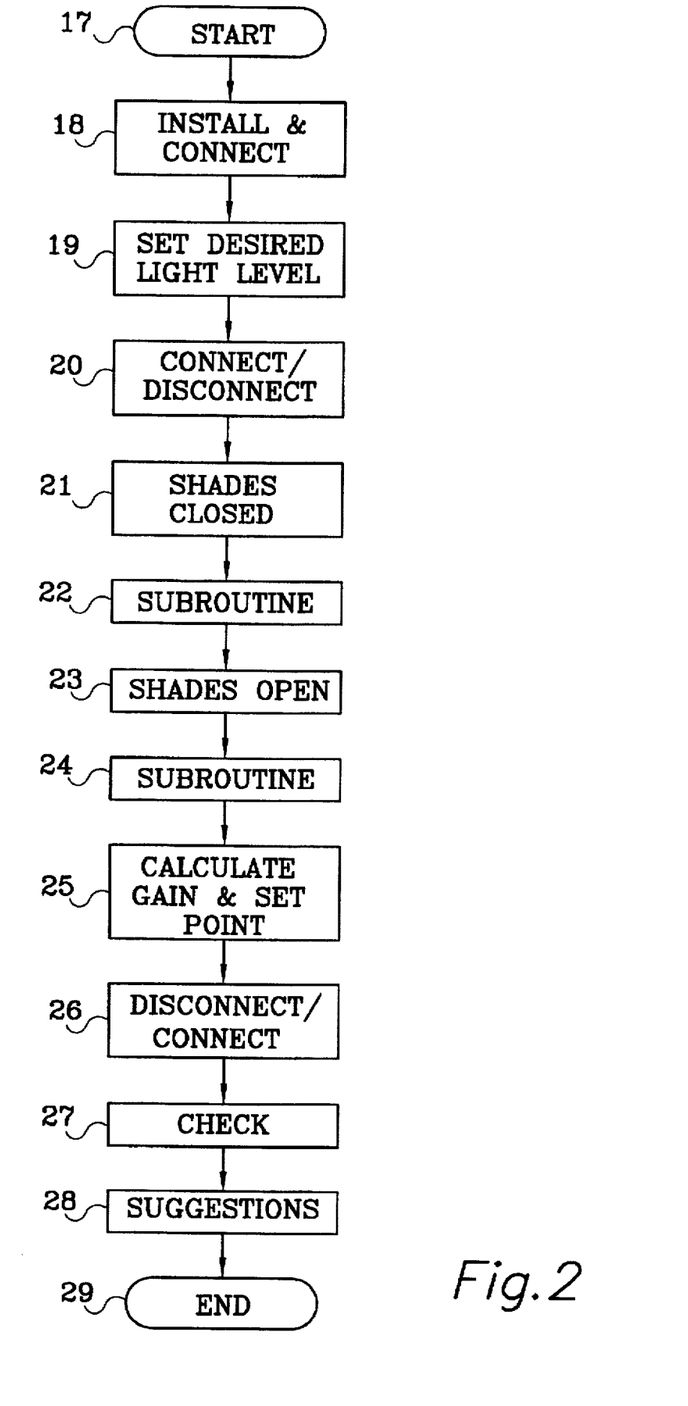
FIG. 2 is a flow diagram of the present invention.

The step-by-step process in FIG. 2 illustrates the preferred embodiment, with references to the environment and equipment illustrated in FIG. 1. Upon entering the illuminated space 8, the technician conducts the installation 18. This involves placing the light meter 13 at the lighting point of interest 7 and connecting the light meter 13 to the programmer 15 if the light meter 13 is not an integral part of the programmer 15. This connection is accomplished by way of physical electrically conductive wires 14 in the preferred embodiment, but may also utilize radio frequency or infra-red logical connections. The technician then "connects" the programmer to the dimming electronics 12. This connection could be a physical connection, such as electrically conductive wire 16, in a dedicated one-zone system or could include both physical and logical connections if the communications system between the electronics and the programmer is a network. One such network is Echelon's Local Operating Network.

In block 19, the desired light level for the illuminated point of interest 8 is then entered into programmer 15. In the preferred embodiment, this step is accomplished by typing the light level into programmer's 15 keyboard; however, the step could also be accomplished by entering the light level with any other common input device, such as a numeric keypad, or a rotating knob attached to a position sensor, or could be read in from electronic memory or any other data storage medium.

In block 20, the programmer 15 logically disconnects the ambient light sensor 11 from the dimmer electronics 12, and logically connects the ambient light sensor 11 output to programmer 15 so that it can read the value of Es. Programmer 15 also connects to dimmer electronics 12 to directly control the electrical light level Ee. This action by the programmer 15 opens the feedback control loop between the ambient light sensor 11 and the dimmer electronics 12.

In block 21, programmer 15 issues a command to close the shades over the exterior windows 10 to the illuminated space 8. In the preferred embodiment, this command is issued to the technician as some sort of visible or audible signal, but the command could also be given audibly or electronically to automated devices which actuate the window blinds. The closing of the window blinds blocks the natural light from entering through the exterior windows 10, making Eo approximately zero. Eo does not have to be exactly zero when the blinds are closed but must not contribute significantly to Ew or Es when compared to the light contributed by the electric light fixture 9 when the lights are fully dimmed. When the technician has finished closing the blinds, he indicates the completed action to the programmer 15 by pressing a designated key. In other embodiments, the technician could utilize other known input methods to signal the completion of this step to the programmer 15, or in the case of a fully automated system, the window blind actuators could send a signal back to the programmer 15.

Measuring subroutine 22 then causes the light fixture 9 to go to a minimum level via the connection 16 between the dimmer electronics 12 and the programmer 15. The subroutine 22 then records the values of Es and Ew as measured by the ambient light sensor 11 and the light meter 13, respectively. The subroutine 12 then causes the light level Ee to go to a maximum level via the connection 16 between the dimmer electronics 12 and the programmer 15 and records the values of Es and Ew as measured by the ambient light sensor 11 and the light meter 13, respectively.

In block 23, programmer 15 issues a command to open the shades over the exterior windows 10 to the illuminated space 8. Again, in the preferred embodiment, this command is issued to the technician as some sort of visible or audible signal, but the command could also be given audibly or electronically to automated devices which actuate the window blinds. When the technician has finished closing the blinds, he indicates the completed action to the programmer 15 by pressing a designated key. In other embodiments, the technician could utilize other known input methods to signal the completion of this step to the programmer 15, or in the case of a fully automated system, the window blind actuators could send a signal back to the programmer 15.

Measuring subroutine 24, which should optimally be run when the sunlight is approximately perpendicular to the exterior windows 10, then causes the light fixture 9 to go to a minimum level via the connection 16 between the dimmer electronics 12 and programmer 15. When the window faces away from the sun most of the day (Example: North facing window in the northern hemisphere), then the optimal time to run the test is any time the sun does not shine directly on the window. The subroutine 22 then records the values of Es and Ew as measured by the ambient light sensor 11 and the light meter 13, respectively. The subroutine 24 then causes the light level Ee to go to a maximum level via the connection 16 between the dimmer electronics 12 and the programmer 15 and records the values of Es and Ew as measured by the ambient light sensor 11 and the light meter 13, respectively.

The two measuring subroutines obtain four different values for Es and Ew. The first is for the condition of shades closed, minimum electrical light. The second is for the condition of shades closed, maximum electrical light. The third is for the condition of shades open, minimum electrical light. The fourth is for the condition of shades open, maximum electrical light.

After recording each of the lighting levels, Es and Ew, at each of these four conditions, programmer 15 then calculates the values of the electronic gain and setpoint based on the eight measurements made.

This process, indicated by block 25 is described in detail later in this specification in connection with FIGS. 3–5 and the associated equations. The programmer then communicates the calculated gain and setpoint values to dimmer electronics 12 where they are stored in non-volatile memory. Sometimes physical arrangements of light sensor 11, exterior window 10, and fixtures within the illuminated space make the calculation of the gain and setpoint impossible or inaccurate. In such a situation, the programmer 15 indicates this condition by displaying an error message.

In block 26, programmer 15 then logically disconnects itself from the dimming electronics 12 and connects the ambient light sensor 11 to the dimming electronics 12, restoring the lighting feedback loop. The electrical light level Ee is now controlled through the dimming electronics 12 by the ambient light sensor 11. The programmer 15 reads the light meter 13 (with the window shades open) and compares the actual reading of Ew with the desired reading of Ew (as input earlier by the technician or as read from memory or other data storage). The programmer 15 then issues a command to close the shades over the exterior windows 10 to the illuminated space 8. The technician, or an automated system, then closes the shades and indicates the completion of the action to programmer 15 (typically by pressing a designated key on the programmer). Programmer 15 reads the light meter 13 (with the window shades closed) and compares the actual reading of Ew with the desired reading of Ew. In block 28, if the readings do not agree within a tolerance for shades open or shades closed, programmer 15 makes suggestions on what adjustments to make to improve the system's performance. In the final step 29, the technician disconnects the programmer 15 and light meter 13. Note that many of the steps above are, or can be, handled automatically by programmer 15, and other steps are routine, for example, connecting light meter 13 or closing and opening the shades. All of the steps are deterministic except block 25, where specific reasons for the failure can be made, and block 28, where the calibration procedure fails completely.

Referring to FIG. 1, a typical illuminated space 8 is illustrated with outside light Eo and electric light Ee contributing to the light Ew at an illuminated point of interest 7. It is desired to keep the lighting level at the illuminated point of interest constant, regardless of the level of outside light Eo. The signal flow diagram of the system can be seen in FIG. 4.

Figure 4:
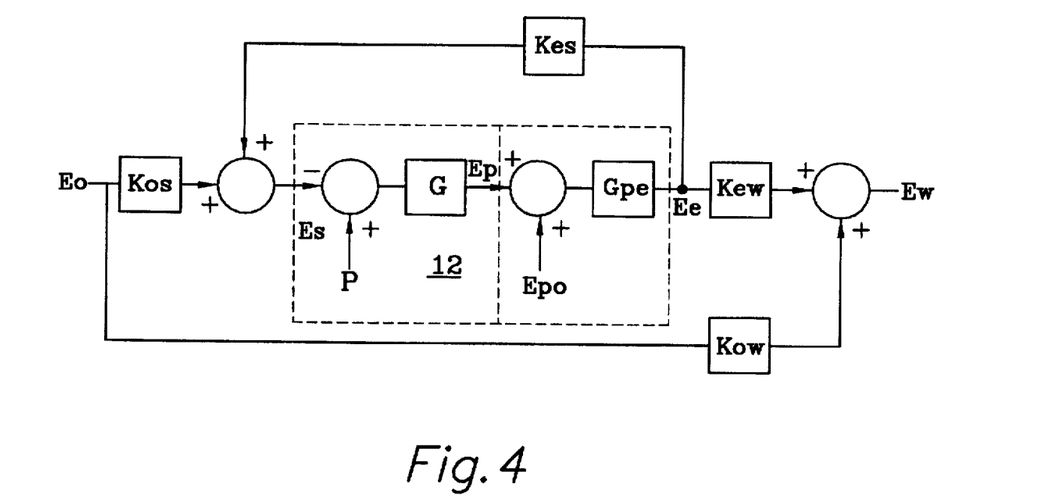
FIG. 4 is a signal flow diagram of a lighting level control apparatus in accordance with the present invention.

As seen in FIG. 4, the light level at the light sensor 11, can be stated as:

$$Es = Ee*Kes + Eo*Kos \quad \text{(Equation 1)}$$

and the light level at the illuminated point of interest 7 can be stated as:

$$Ew = Ee*Kew + Eo*Kow \quad \text{(Equation 2)}$$

where Kes, Kos, Kew, and Kow are constants calculated by taking the spacial geometry of the illuminated space 8 and the reflectiveness of the materials within the space into account. Note that Kow and Kos may vary with the time of day since the exterior light varies as the sun changes position. It is best to cover the windows with a diffusing material to reduce this time of day variation in exterior light. Kew and Kes also may vary as the furniture, materials, and people within the illuminated space 8 move around.

Figure 3:
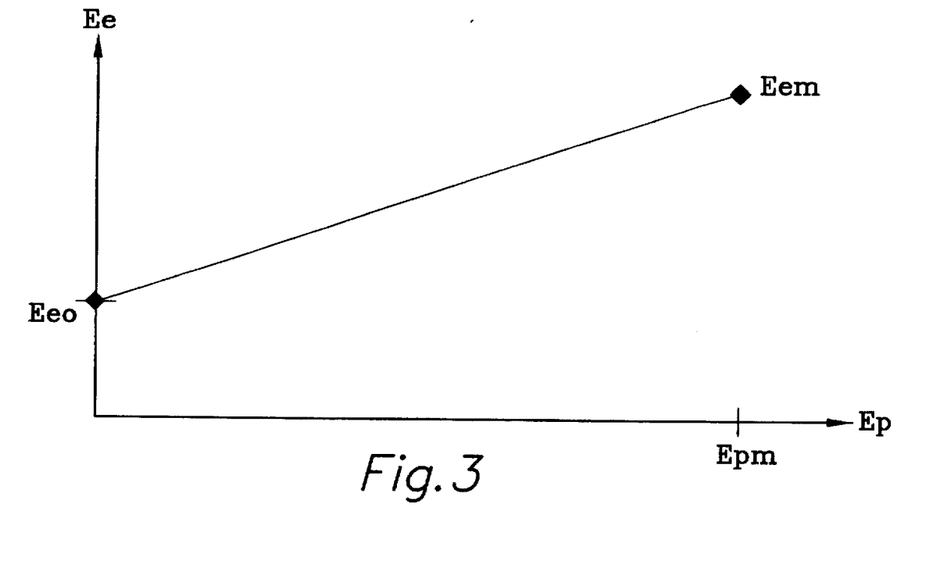
FIG. 3 is a graph of electric light versus control signal for a light adjusted by the present invention.

FIG. 3 graphs the electric lighting level Ee produced by the lighting system versus the control signal Ep from the dimming electronics 12 to the electric light ballast, resulting in electric lighting level Ee. In the graph in FIG. 3, the transfer function from the control signal to the light output is Gpe. Where Eeo is the minimum light level that the lighting system is capable of producing when Ep is zero. The maximum light level that the lighting system is capable of producing from the fixture is Eem when the control signal Ep is Epm. This relationship can be expressed as:

$$Ee = Eeo + Ep*Gpe \quad \text{(Equation 3)}$$

Substituting Epo for Eeo/Gpe results in $$Ee = Gpe*(Epo + Ep) \quad \text{(Equation 4)}$$

The dimming electronics 12 multiplies the difference between the light sensor 11 output Es and a preselected setpoint P by a gain constant G, and applies that product to the ballast of the electric light 9. FIG. 4 illustrates a complete signal flow diagram of electronics 12, lighting fixture 9 and the room's spatial constants. Electronics 12 and lighting fixture 9 are outlined by the dashed lines.

Note that Gpe and Kes can be combined into a single gain constant, Kps, where Kps=Kes*Gpe. Gpe and Kew can also be combined into a single gain constant, Kpw, where Kpw=Kew*Gpe. A new signal flow diagram, illustrated in FIG. 5, can thus be drawn.

Figure 5:
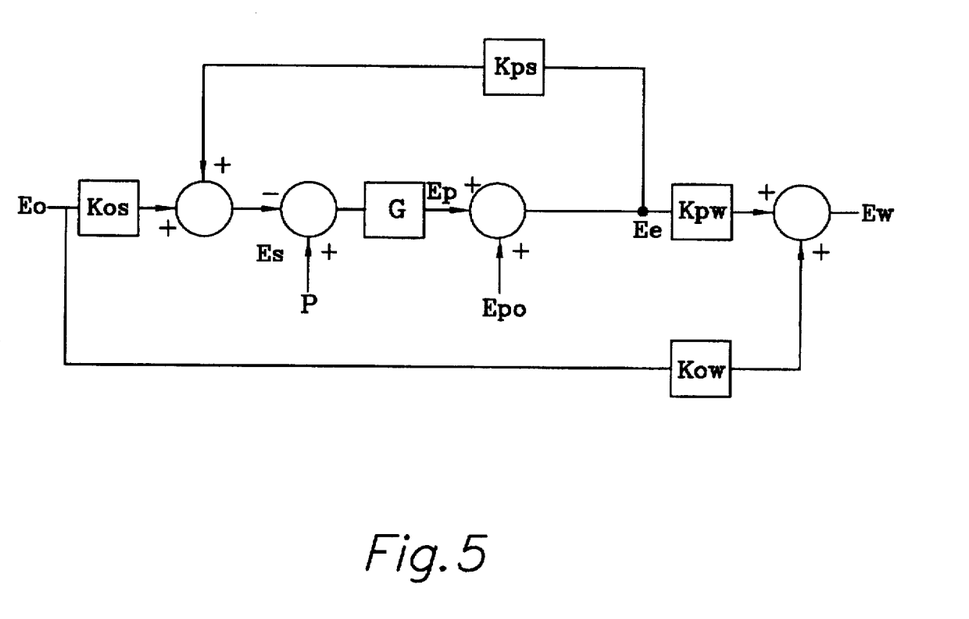
FIG. 5 is a simplified signal flow diagram of a lighting level control apparatus in accordance with the present invention.

Referring to the flow diagram of FIG. 5, it can be seen that:

$$Ew = \frac{Eo*(Kow - Kos*Kpw*G) + Kpw*(Epo + G*P)}{1 + Kps*G} \quad \text{(Equation 5)}$$

If Ew is independent of Eo, then:

$$Kow - Kos*Kpw*G = 0 \quad \text{(Equation 6)}$$

This yields:

$$G = \frac{Kow}{Kpw * Kos} \quad \text{(Equation 7)}$$

Solving for P:

$$P = \frac{Ew*[1 + (Kps/Kpw)*(Kow/Kos)] - Kpw*Epo}{Kow/Kos} \quad \text{(Equation 8)}$$

By utilizing the method depicted in FIG. 2 it is possible to calculate the values of P and G. P and G are variables set by programmer 15 which controls the feedback loop and intensity level Ee of lighting source 9. Measuring subroutine 22 measures the work plane sensor 13 light intensity (Ew1) when Eo=0 and Ep=0. Measuring subroutine 22 also measures the ambient light sensor 11 light intensity (Es1) when Eo=0 and Ep=0. When the intensity of light fixture 9 is set at max, (Ep is set at Epm) work plane sensor 13 measures the ambient light Ew2 with Eo still equal to 0 and Ep equal to Epm. The ambient light sensor 13 measures Es2 which is the ambient light when Eo=0 and Ep=Epm. Based on these measured values Epo can be calculated as:

$$Epo=Ew1*Epm/(Ew2-Ew1) \quad \text{(Equation 9)}$$

$$Epo=Es1*Epm/(Es2-Es1) \quad \text{(Equation 10)}$$

If Epo in the above two equations is calculated and the values do not agree within a predetermined tolerance, either the work plane and/or the ambient light sensor is not placed to receive sufficient electric light or the light reaching the sensor is not controlled by the electric light 9.

Subroutine 24 is then used to calculate the work place sensor with Eo at an unknown value, Ep=0 and Epo=0. Ep and Epo is set to 0 by mining the lights off. The ambient light at work plane sensor 13 is measured as Ew3 and the ambient light sensor 11 measures Es3. Subroutine 25, based on the measured values of Ew1 through Ew3 and Es1 through Es3, calculates G and P as:

$$G=[Epm/(Ew2-Ew1)]*[Ew3/Es3]; \quad \text{(Equation 11)}$$

P can be calculated as:

$$P = \frac{Ew0*[1 + (Es1/Ew1)*(Ew3/Es3)] - Ew1}{(Ew3/Es3)} \quad \text{(Equation 12)}$$

where G is the electronic gain of the feedback loop. P is the setpoint of the feedback loop. Ew0 is the desired work plane light intensity. Epm is a fullscale output value from the lighting controller. Es1 is the ambient light sensor reading with the shades closed and the lights at minimum. Ew1 is the work place sensor reading with the shades closed and the lights at minimum. Es2 is the ambient light sensor reading with the shades closed and the lights at maximum. Ew2 is the work plane sensor reading with the shades closed and the lights at maximum. Es3 is the ambient light sensor reading with the shades open and the lights off and Ew3 is the work plane sensor reading with the shades open and the lights off.

By following the method described herein, one is able to calculate G and P and set the dimmer electronics 12 in order to maintain a constant light intensity at work surface 7.

What is claimed is:

1. A method of calibrating a dimmable lighting system, having an electric lighting fixture, or ambient light sensor, an electronic controller and a programmer for controlling a feedback loop between said ambient light sensor and said electronic controller, comprising the steps of:

adjusting an output level of an electric lighting fixture in a workspace to a minimum and adjusting an outdoor light level in the workspace to a minimum;

sensing and recording a first illumination level at an ambient light sensor and a first illumination level at a lighting point of interest;

adjusting the output level of the electric lighting fixture to a maximum;

sensing and recording a second illumination level at said ambient light sensor and a second illumination level at said lighting point of interest;

adjusting said outdoor light level to a maximum and adjusting said electric lighting fixture output level to a minimum;

sensing and recording a third illumination level at the ambient light sensor and a third illumination level at the lighting point of interest;

adjusting said output level of said electric lighting fixture to a maximum while holding said outdoor light level at a maximum;

sensing and recording a fourth illumination level at the ambient light sensor and a fourth illumination level at the lighting point of interest;

calculating a gain value and a setpoint value for said dimmable lighting system from the eight sensed illumination levels and a predetermined illumination level at the lighting point of interest;

communicating the gain value and the setpoint value to the electronic controller of the dimmable lighting system, said electronic controller utilized to control an electrical input to the electric lighting fixture.

2. A method in accordance with claim 1 wherein at least one of the steps is performed by an electronic programmer connected to a light meter and the electronic controller, said light meter located at the lighting point of interest to sense the illumination level.

3. A method in accordance with claim 2 including the additional steps of:

connecting the electronic programmer to the electronic controller;

electrically disconnecting the ambient light sensor from the electronic controller;

electrically connecting the ambient light sensor to the electronic programmer;

electrically disconnecting the ambient light sensor from the electronic programmer;

electrically reconnecting the ambient light sensor to the electronic controller; and disconnecting the electronic programmer from the electronic controller.

4. A method in accordance with claim 1, further comprising the steps of:

connecting the electronic controller to the ambient light sensor;

controlling the light output of the electric light fixture with the electronic controller;

adjusting the outdoor lighting level to a maximum;

sensing and recording a first illumination level at the lighting point of interest;

comparing the first illumination level to the predetermined illumination level for the lighting point of interest;

adjusting the outdoor lighting level to a minimum;

sensing and recording a second illumination level at the lighting point of interest;

comparing the second illumination level to the predetermined illumination level for the lighting point of interest;

determining an appropriate adjustment based on a difference between the first illumination level and the predetermined illumination level and between the second illumination level and the predetermined illumination level.

5. A method in accordance with claim 4 wherein at least one of the steps is performed by an electronic programmer connected to a light meter and the electronic controller, said light meter located at the lighting point of interest to sense the illumination level.

6. A method in accordance with claim 5 including the additional steps of:

connecting the electronic programmer to the electronic controller;

electrically disconnecting the ambient light sensor from the electronic controller;

electrically connecting the ambient light sensor to the electronic programmer;

electrically disconnecting the ambient light sensor from the electronic programmer;

electrically reconnecting the ambient light sensor to the electronic controller; and disconnecting the electronic programmer from the electronic controller.

7. A method of calibrating a dimmable lighting system wherein said lighting system comprises a programmer for controlling a feedback loop between an ambient light sensor and an electronic controller, comprising the steps of:

adjusting an output level of an electric lighting fixture in a workspace to a minimum and adjusting an outdoor light level in the workspace to a minimum;

sensing and recording a first illumination level $E_{S1}$ at an ambient light sensor and a first illumination level $E_{W1}$ at a lighting point of interest;

adjusting the output level of the electric lighting fixture to a maximum $E_{PM}$;

sensing and recording a second illumination level $E_{S2}$ at the ambient light sensor and a second illumination level $E_{W2}$ at the lighting point of interest;

adjusting the outdoor light level to a maximum and adjusting the electric lighting fixture output level to a minimum;

sensing and recording a third illumination level $E_{S3}$ at the ambient light sensor and a third illumination level $E_{W3}$ at the lighting point of interest;

adjusting the output level of the electric lighting fixture to a maximum while holding the outdoor light level at a maximum;

sensing and recording a fourth illumination level $E_{S4}$ at the ambient light sensor and a fourth illumination level $E_{W4}$ at the lighting point of interest;

calculating a gain value and a setpoint value for the dimmable lighting system from the eight sensed illumination levels and a predetermined illumination level $E_{W0}$ at the lighting point of interest;

whereby the gain value is determined from the equation:

$$G = [E_{PM}/(E_{W2} - E_{W1})] * [E_{W3}/E_{S3}];$$

and the setpoint value is determined from the equation:

$$P = \{E_{W0} * [1 + (E_{S1}/E_{W1} * (E_{W3}/E_{S3}))] - E_{W1}\}/(E_{W3}/E_{S3});$$

communicating the gain value and the setpoint value to the electronic controller of the dimmable lighting system, said electronic controller utilized to control an electrical input to the electric lighting fixture.

8. A method in accordance with claim 7 wherein at least one of the steps is performed by an electronic programmer connected to a light meter and the electronic controller, said light meter located at the lighting point of interest to sense the illumination level.

9. A method in accordance with claim 8 including the additional steps of:

electrically disconnecting the ambient light sensor from the electronic controller;

electrically connecting the ambient light sensor to the electronic programmer;

electrically disconnecting the ambient light sensor from the electronic programmer;

electrically reconnecting the ambient light sensor to the electronic controller; and disconnecting the electronic programmer from the electronic controller.

* * * * *